(12) United States Patent
Chang et al.

(10) Patent No.: US 7,587,046 B2
(45) Date of Patent: Sep. 8, 2009

(54) METHOD AND APPARATUS FOR GENERATING KEYSTREAM

(75) Inventors: Ku Young Chang, Daejeon (KR); Mun Kyu Lee, Daejeon (KR); Hang Rok Lee, Daejeon (KR); Do Won Hong, Daejeon (KR); Ju Sung Kang, Seoul (KR); Hyun Sook Cho, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 866 days.

(21) Appl. No.: 11/081,681

(22) Filed: Mar. 17, 2005

(65) Prior Publication Data

US 2006/0098820 A1    May 11, 2006

(30) Foreign Application Priority Data

Nov. 10, 2004  (KR) ............... 10-2004-0091577

(51) Int. Cl.
*H04L 9/00* (2006.01)
*G06F 7/58* (2006.01)
(52) U.S. Cl. ........................ 380/44; 708/250
(58) Field of Classification Search ........... None
See application file for complete search history.

(56) References Cited

U.S. PATENT DOCUMENTS

| 4,225,849 A * | 9/1980 | Lai ............... 340/146.2 |
| 2003/0236803 A1* | 12/2003 | Williams ............ 708/252 |
| 2006/0039558 A1* | 2/2006 | Morii et al. ........... 380/46 |

FOREIGN PATENT DOCUMENTS

| EP | 619659 A2 * | 10/1994 |
| KR | 1020030035737 | 5/2003 |
| KR | 100250468 | 1/2004 |
| WO | WO 01/55837 | 8/2001 |
| WO | WO 2004032098 A1 * | 4/2004 |

OTHER PUBLICATIONS

Coppersmith et al, "The Shrinking Generator", Springer-Verlag, copyright 1998, pp. 22-39.*
Lee et al, "The Tag Authentication Scheme using Self-Shrinking Generator on RFID Systems", Proceedings of World Academy of Science, Engineering and Technology, vol. 18, Dec. 2006, pp. 52-57.*

(Continued)

*Primary Examiner*—Ponnoreay Pich
(74) *Attorney, Agent, or Firm*—Lowe Hauptman Ham & Berner, LLP

(57) ABSTRACT

A method and apparatus for generating a keystream are provided. The method includes: (a) receiving a bitstream comprised of at least 4 bits; (b) selecting at least two bits from the received bitstream; (c) generating an operation value by performing a predetermined bitwise operation on the bits selected in (b); and (d) determining whether to discard the received bitstream or to output the rest of the received bitstream not selected in (b) according to the operation value. The method and apparatus for generating a keystream are expected to be suitable for a ubiquitous computing and network environment and to provide high security or high efficiency.

12 Claims, 5 Drawing Sheets

OTHER PUBLICATIONS

Hu et al, "Generalized Self-Shrinking Generator", IEEE Transactions on Information Theory, vol. 50, No. 4, copyright Apr. 2004, pp. 714-719.*

Chang et al, "New Variant of the Self-Shrinking Generator and its Cryptographic Properties", ISISC 2006, pp. 1-21.*

A. Kh. Al Jabri, "Shrinking Generators and Statistical Leakage", Computers Math. Applic. vol. 32, No. 4, copyright 1996, pp. 33-39.*

Menezes et al, "Handbook of Applied Cryptography", copyright 1997, pp. 211-212 and 221.*

Rainer A. Rueppel, "When Shift Registers Clock Themselves", Springer-Verlag Berlin Heidelberg, copyright 1998, pp. 53-64.*

Gong et al, "The editing generator and its cryptanalysis", Int. J. Wireless and Mobile Computing, vol. 1, No. 1, 2005, pp. 46-52, copyright 2005.*

Willi Meier, et al.; "The Self-Shrinking Generator"; A.De Santis (Ed.): Advances in Cryptology—Eurocrypt'94, LNCS 950; pp. 205-214, 1995.

* cited by examiner

METHOD AND APPARATUS FOR GENERATING KEYSTREAM

BACKGROUND OF THE INVENTION

This application claims the priority of Korean Patent Application No. 10-2004-0091577, filed on Nov. 10, 2004, in the Korean Intellectual Property Office, the disclosure of which is incorporated herein in its entirety by reference.

1. Field of the Invention

The present invention relates to a method and apparatus for generating a keystream, and more particularly, to a method and apparatus for generating a keystream, which are suitable for a ubiquitous computing and network environment and provide high security and efficiency.

2. Description of the Related Art

In modern cryptography, there are two kinds of ciphers, i.e., symmetric ciphers and asymmetric ciphers.

Symmetric ciphers are classified into stream ciphers and block ciphers. Stream ciphers are generated by performing a bitwise XOR operation on a sequence of random bits and a plaintext desired to be protected. Stream ciphers are a practical application of one time pads which are considered secure from the viewpoint of information theory.

Block ciphers are designed based on Shannon's theory that more secure and more robust ciphers can be generated by repeatedly performing a substitution operation and a permutation operation, i.e., by repeatedly using a round function, which is considered relatively weak.

A keystream generated by an apparatus for generating a keystream can be used as a key or a pseudo-random number, which is a core element of an information protection service that involves encryption/decryption, authentication, and integrity. An apparatus for generating a keystream is closely related to stream ciphers. Currently, various types of stream ciphers generated using block ciphers or linear feedback shift registers (LFSRs) have been developed.

Specifically, stream ciphers may be generated by applying modes of operation of a block cipher or using some of a plurality of rounds of a block cipher rather than using the entire rounds of a block cipher. Alternatively, stream ciphers may be generated by combining at least one LFSR with a nonlinear Boolean function.

A data communication environment is expected to evolve in the near future into a ubiquitous computing and network environment, such as radio frequency identification (RFID)/ubiquitous sensor network (USN). Such a ubiquitous computing and network environment requires devices to be small, light, cheap, and mobile. In this regard, traditional stream cipher technology may be considered inappropriate for such a ubiquitous environment which is highly resource-constrained.

The self-shrinking generator (SSG) has been suggested by W. Meier and O. Staffelbach (in Eurocrypt '94) as a way to solve the problems with stream cipher-based technology. SSG, which serves as an apparatus for generating a keystream, receives two bits from an LFSR and determines whether a least significant bit of the two bits has a logic value of 1. Thereafter, if the least significant bit has a logic value of 1, SSG outputs a most significant bit of the two bits. If the least significant bit has a logic value of 0, SSG discards the most significant bit.

SSG, however, has limited application to various types of cryptography. In particular, there is a limitation in meeting the various requirements of a ubiquitous environment concerning security and efficiency.

SUMMARY OF THE INVENTION

The present invention provides a method and apparatus for generating a key stream, which select at least two bits from a given bitstream comprised of at least 4 bits, perform an operation on the selected bits, and determine whether to output the rest of the given bitstream as a keystream according to the operation result.

According to an aspect of the present invention, there is provided a method of receiving a bitstream and generating a keystream used in a cryptosystem. The method includes: (a) receiving a bitstream comprised of at least 4 bits; (b) selecting at least two bits from the received bitstream; (c) generating an operation value by performing a predetermined bitwise operation on the bits selected in (b); and (d) determining whether to discard the received bitstream or to output the rest of the received bitstream not selected in (b) as a keystream according to the operation result.

According to another aspect of the present invention, there is provided an apparatus for receiving a bitstream and generating a keystream used in a cryptosystem. The apparatus includes: a bitstream input unit, which receives a bitstream comprised of at least 4 bits from a bitstream generator; a selection unit, which selects at least two bits from the received bitstream; an operation unit, which generates an operation value by performing a predetermined bitwise operation on the bits selected by the selection unit; and a determination unit, which determines whether to discard the received bitstream or to output the rest of the received bitstream not selected by the selection unit as a keystream according to the operation result.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
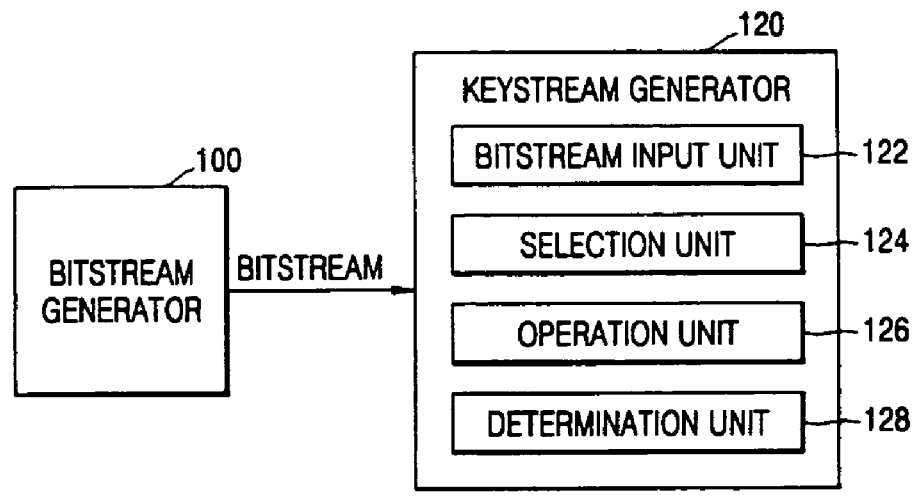
FIG. 1 is a block diagram of an apparatus for generating a keystream according to an exemplary embodiment of the present invention.

FIG. 1 is a block diagram of an apparatus for generating a keystream according to an exemplary embodiment of the present invention. Referring to FIG. 1, the apparatus includes a bitstream generator 100 and a keystream generator 120.

The bitstream generator 100 may be a linear feedback shift register (LFSR) that generates a bitstream. A method of generating a bitstream using the bitstream generator 100 will be described later in detail with reference to FIG. 2.

The keystream generator 120 includes a bitstream input unit 122, a selection unit 124, an operation unit 126, and a determination unit 128.

The bitstream input unit 122 receives a bitstream comprised of a predetermined number of bits (preferably, but not necessarily, at least 4 bits) from the bitstream generator 100.

The selection unit 124 selects at least two bits from the bitstream received by the bitstream input unit 122.

The operation unit 126 generates an operation value by performing an operation on the selected bits.

The determination unit 128 determines whether to output the rest of the bitstream that has not been selected by the selection unit 124 as a keystream or to discard them according to the result generated by the operation unit 126, a process which will be described later in further detail with reference to FIGS. 3 through 6.

Figure 2:
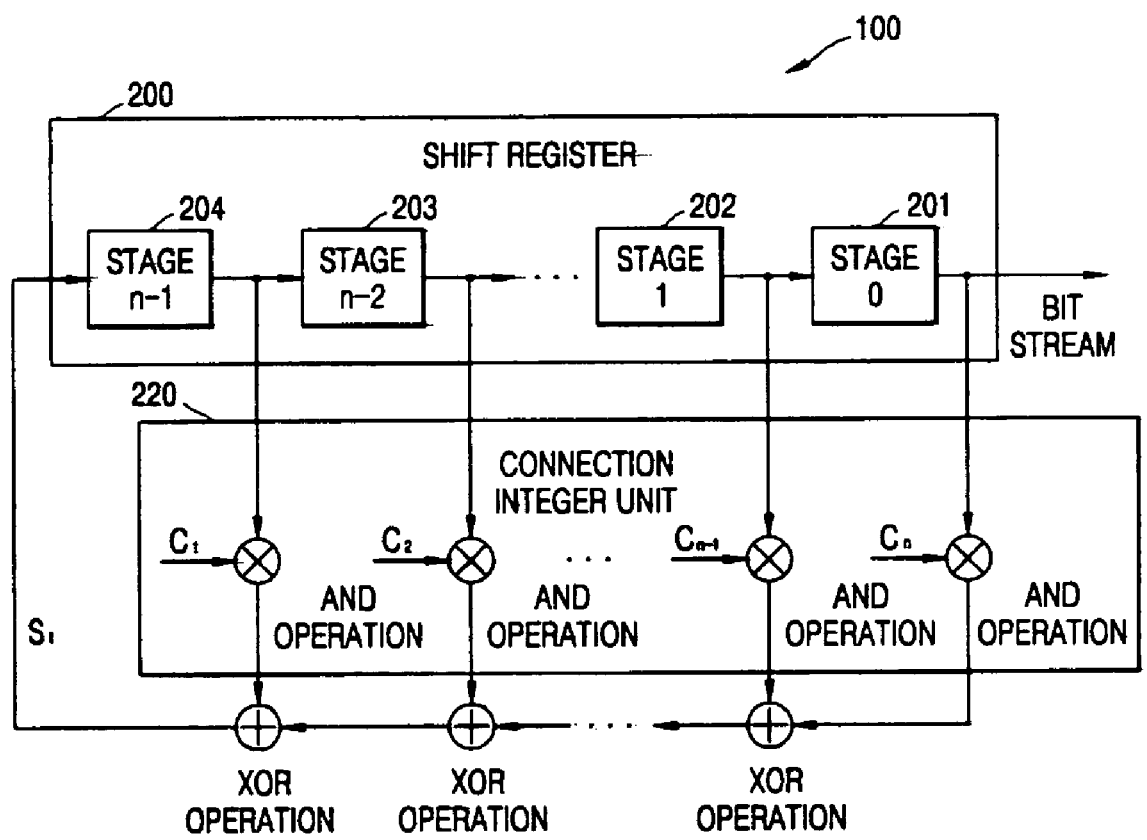
FIG. 2 is a detailed block diagram of a bitstream generator of FIG. 1.

FIG. 2 is a detailed block diagram of the bitstream generator 100 of FIG. 1. Referring to FIG. 2, the bitstream generator 100 may be an LFSR, which includes a shift register 200 and a connection integer unit 220. Stage values used in the shift register 200 and connection integers $C_1, C_2, \ldots, C_{n-1}$, and $C_n$ used in the connection integer unit 220 have either a logic low value (=0) or a logic high value (=1).

The connection integer unit 220 has the connection integers $C_1, C_2, \ldots, C_{n-1}$, and $C_n$. Different LFSRs have different sets of connection integers from one another. The connection integers $C_1, C_2, \ldots, C_{n-1}$, and $C_n$ have a logic value of 0 or a logic value of 1. The connection integers $C_1, C_2, \ldots, C_{n-1}$, and $C_n$ are used to generate an updated value $S_t$ (where t≧n).

The updated value St is input to an (n−1)-th stage 204, and a value previously input to the (n−1)-th stage 204 is transferred to an (n−2)-th stage 203. Likewise, values previously input to the (n−2)-th stage 203, . . . , a first stage 202 are transferred to an (n−3)-th stage, . . . , a zeroth stage 201, respectively. A value previously input to the zeroth stage 201 is output.

Supposing that $S_{n-1}, S_{n-2}, \ldots, S_1$, and $S_0$ correspond to initial state values of the (n−1)-th stage 204, the (n−2)-th stage 203, . . . , the first stage 202, and the zeroth stage 201, respectively. Then a bitstream $S=S_n, S_{n+1}, \ldots$ is obtained by the following recursion (1):

$$S_t = (C_1 S_{t-1} + C_2 S_{t-2} + \ldots + C_n S_{t-n}) \bmod 2 \tag{1}$$

where t>n−1.

Referring to FIG. 2, a bitwise XOR operation corresponds to a mod 2 addition operation, and a bitwise AND operation corresponds to a mod 2 multiplication operation.

Figure 3:
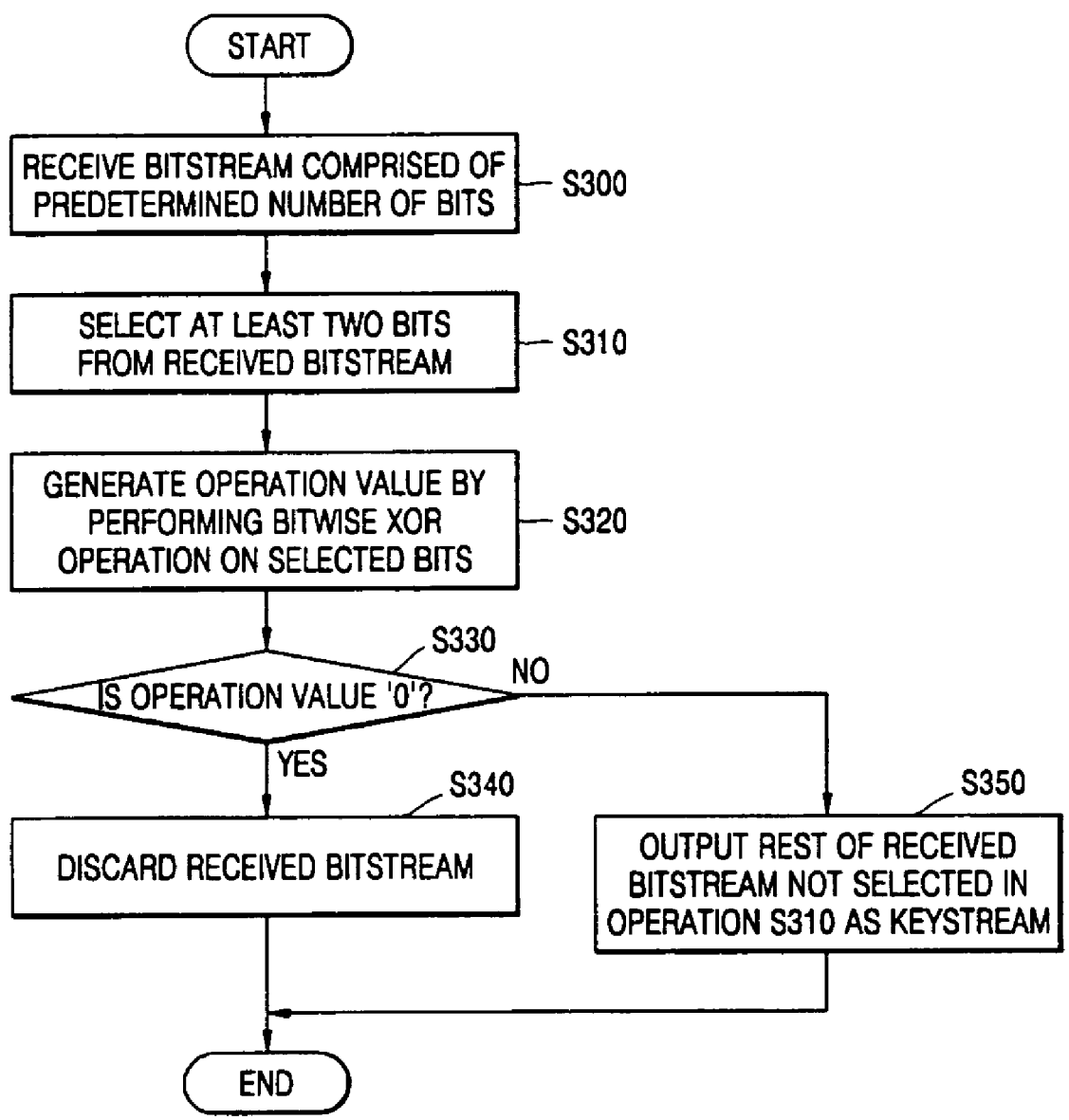
FIG. 3 is a flowchart of a method of generating a keystream according to an exemplary embodiment of the present invention.

FIG. 3 is a flowchart of a method of generating a keystream according to an exemplary embodiment of the present invention. Referring to FIG. 3, in operation S300, the keystream generator 120 receives a bitstream comprised of a predetermined number of bits from the bitstream generator 100.

In operation S310, part of the received bitstream, which is comprised of at least two bits, is selected.

In operation S320, a value is computed by performing a bitwise XOR operation on the bits selected in operation S310.

In operation S330, it is determined whether the value is a logic low value, i.e., 0.

If the operation value is the logic low value (=0) in operation S330, the method proceeds to operation S340, and then the bitstream received in operation S300 is discarded in operation S340. If the operation value is a logic high value (=1) in operation S330, the method proceeds to operation 350, and the rest of the received bitstream not selected in operation S310 are output as a keystream in operation S350.

In short, in the method of generating a keystream of FIG. 3, it is determined whether to output a received bitstream according to the result of performing a bitwise XOR operation on at least two bits selected from the received bitstream. Thus, the method of generating a keystream of FIG. 3 can achieve as high efficiency as a conventional self-shrinking generator (SSG) and can provide a two times longer period and two times higher linear complexity than the conventional SSG.

Figure 4:
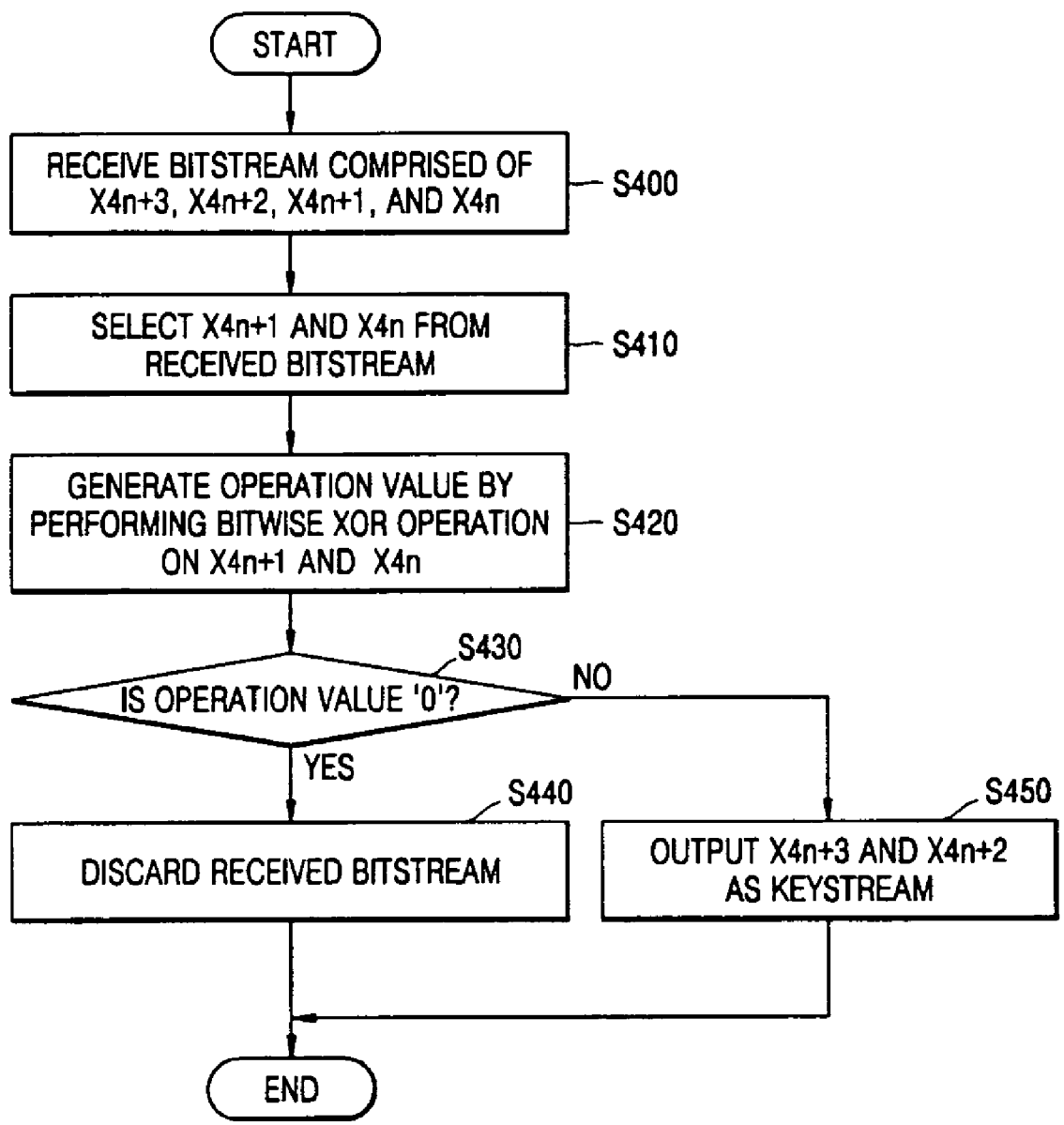
FIG. 4 is a flowchart of an example of the method of generating a keystream of FIG. 3 in which a keystream is generated by selecting two least significant bits from a bitstream comprised of 4 bits as a selection logic.

FIG. 4 is a flowchart of an example of the method of generating a keystream of FIG. 3 in which a keystream is generated by using two least significant bits from a bitstream comprised of 4 bits as the selection logic.

Referring to FIG. 4, in operation S400, the keystream generator 120 receives a bitstream comprised of four bits $X_{4n+3}$, $X_{4n+2}$, $X_{4n+1}$, and $X_{4n}$ from the bitstream generator 100.

In operation S410, the two least significant bits $X_{4n+1}$ and $X_{4n}$ are selected.

In operation S420, a value is computed by performing a bitwise XOR operation on the two least significant bits $X_{4n+1}$ and $X_{4n}$ selected in operation S410.

In operation S430, it is determined whether the value is a logic low value (=0).

If the operation value is the logic low value (=0), the method proceeds to operation S440, and then the bitstream received in operation S400 is discarded. If the operation value is a logic high value (=1), the method proceeds to operation S450, and the rest of the received bitstream not selected in operation S410, i.e., $X_{4n+3}$ and $X_{4n+2}$, are output as a keystream.

Referring to FIG. 4, two least significant bits are selected from a received bitstream. However these bits may not be consecutive ones.

Figure 5:
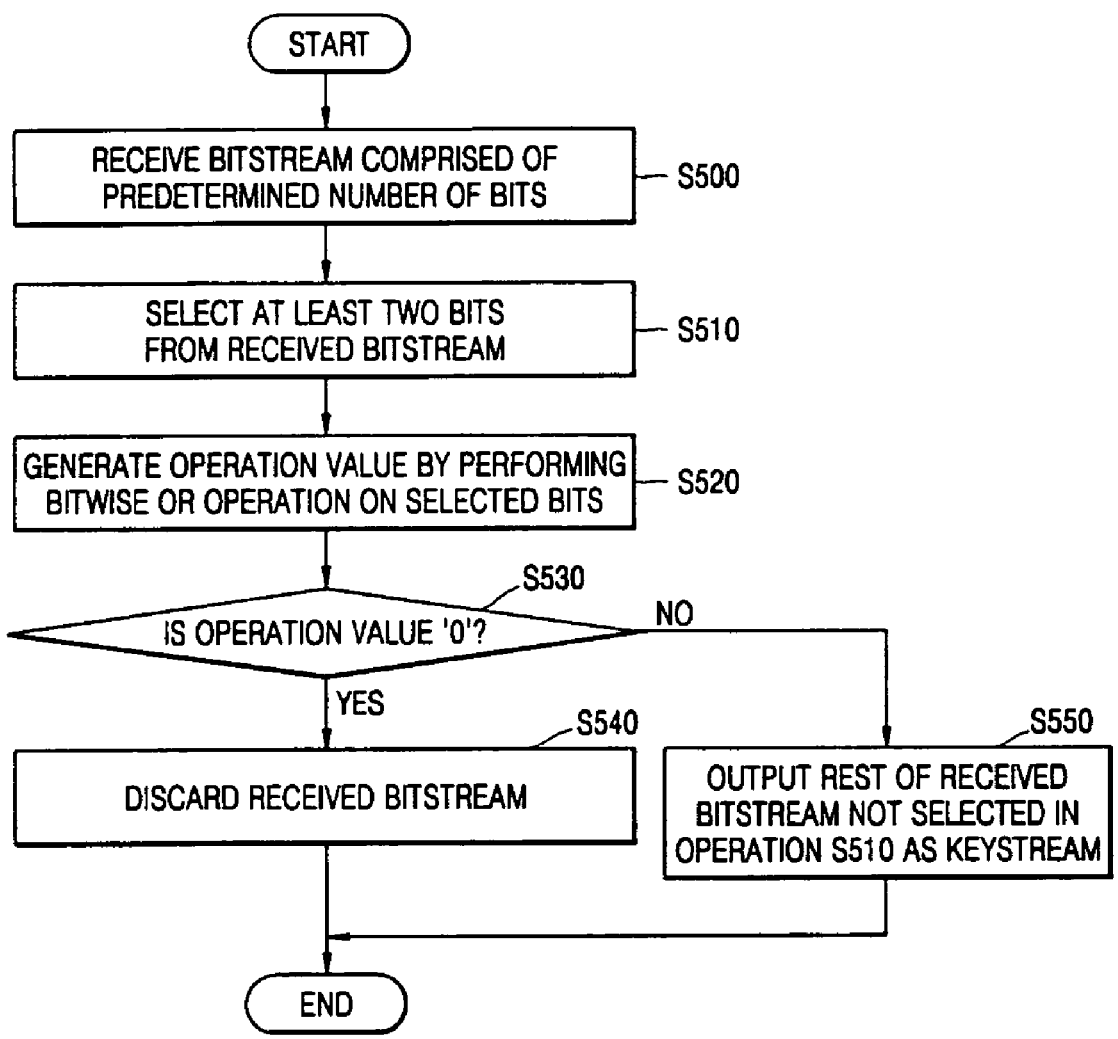
FIG. 5 is a flowchart of a method of generating a keystream according to another exemplary embodiment of the present invention.

FIG. 5 is a flowchart of a method of generating a keystream according to an exemplary embodiment of the present invention. Referring to FIG. 5, in operation S500, the keystream generator 120 receives a bitstream comprised of a predetermined number of bits from the bitstream generator 100.

In operation S510, part of the received bitstream, which is comprised of at least two bits, is selected.

In operation S520, a value is computed by performing a bitwise OR operation on the bits selected in operation S510.

In operation S530, it is determined whether the value is a logic low value, i.e., 0.

If the operation value is the logic low value (=0) in operation S530, the method proceeds to operation S540, and then the bitstream received in operation S500 is discarded in operation S540. If the operation value is a logic high value (=1) in operation S530, the method proceeds to operation 550, and the rest of the received bitstream not selected in operation S510 are output as a keystream in operation S550.

In short, in the method of generating a keystream of FIG. 5, it is determined whether to output a received bitstream according to the result of performing a bitwise OR operation on at least two bits selected from the received bitstream. Thus, the method of generating a keystream of FIG. 5 can achieve higher efficiency than a conventional self-shrinking generator (SSG).

Figure 6:
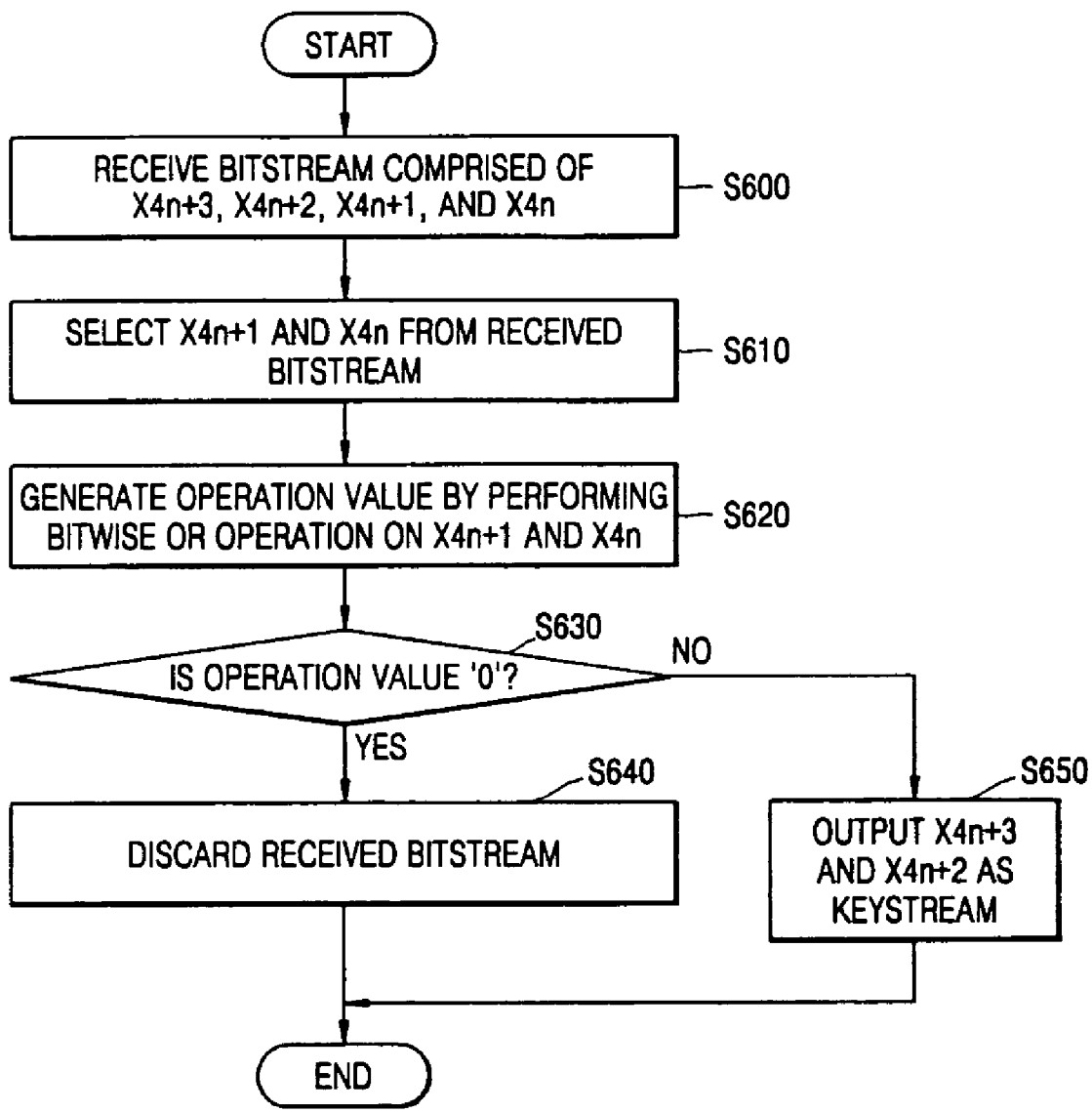
FIG. 6 is a flowchart of an example of the method of generating a keystream of FIG. 5 in which a keystream is generated by selecting two least significant bits from a bitstream comprised of 4 bits.

FIG. 6 is a flowchart of an example of the method of generating a keystream of FIG. 4 in which a keystream is generated by using two least significant bits from a bitstream comprised of 4 bits as the selection logic.

Referring to FIG. 6, in operation S600, the keystream generator 120 receives a bitstream comprised of four bits $X_{4n+3}$, $X_{4n+2}$, $X_{4n+1}$, and $X_{4n}$ from the bitstream generator 100.

In operation S610, the two least significant bits $X_{4n+1}$ and $X_{4n}$ are selected.

In operation S620, a value is computed by performing a bitwise OR operation on the two least significant bits $X_{4n+1}$ and $X_{4n}$ selected in operation S610.

In operation S630, it is determined whether the value is a logic low value (=0).

If the operation value is the logic low value (=0), the method proceeds to operation S640, and then the bitstream received in operation S600 is discarded. If the operation value is a logic high value (=1), the method proceeds to operation S650, and the rest of the received bitstream not selected in operation S610, i.e., $X_{4n+3}$ and $X_{4n+2}$, are output as a keystream.

Referring to FIG. 6, a bitwise OR operation is performed on the two least significant bits $X_{4n+1}$ and $X_{4n}$ of the bitstream received in operation 600. As a result of the bitwise OR operation, the probability of the operation value being a logic value of 1 is 75%. The method of generating a keystream of FIG. 6 achieves slightly lower cryptographic security but 50% higher efficiency than the method of generating a keystream of FIG. 3 or 4.

Thus, if a user thinks security is more important than efficiency when generating a keystream, then he or she may want to use the method of generating a keystream of FIG. 3 or 4 in which a bitwise XOR operation is performed. If the user thinks efficiency is more important than security when generating a keystream, he or she may want to use the method of generating a keystream of FIG. 5 or 6 in which a bitwise OR operation is performed. In short, the user may choose between the method of generating a keystream of FIG. 3 and the method of generating a keystream of FIG. 5 in consideration of a trade-off between efficiency and security.

Referring to FIG. 6, two least significant bits are selected from a received bitstream. However these bits may not be consecutive ones.

The present invention may be realized as computer-readable codes recorded on a computer-readable recording medium. Examples of the computer-readable recording medium include nearly all kinds of recording devices on which data is stored in a computer-readable manner. For example, the computer-readable recording medium may comprise (i) a computer-readable storage medium such as a ROM, a RAM, a CD-ROM, a magnetic tape, a floppy disc, an optical data storage, and (ii) a carrier wave (e.g., the transmission of data through the Internet). The computer-readable recording medium may be distributed over a plurality of computer systems connected to a network so that computer-readable codes can be stored and executed in the computer-readable recording medium in a decentralized manner.

As described above, the method and apparatus for generating a keystream according to the present invention have the following advantages. First, the method and apparatus for generating a keystream according to the present invention may be realized using an LFSR and a keystream generator, and thus, they are expected to be suitable for a highly resource-constrained environment such as a ubiquitous environment. In addition, the method and apparatus for generating a keystream according to the present invention can achieve high operating speed and can be realized using only a small number of gates.

Second, the method and apparatus for generating a keystream according to the present invention may generate a keystream using either an XOR operation or an OR operation. When using the XOR operation, the method and apparatus for generating a keystream according to the present invention can achieve high security compared to the prior art. When using the OR operation, on the other hand, the method and apparatus for generating a keystream according to the present invention can achieve high efficiency compared to the prior art. Thus, a user is allowed to choose between these two embodiments of the present invention in consideration of a trade-off between efficiency and security.

Third, the method and apparatus for generating a keystream according to the present invention helps realize a new algorithm using an LFSR already realized in a cryptosystem where encryption, authentication, and integrity are required. In other words, it is possible to realize the method and apparatus for generating a keystream according to the present invention in the cryptosystem through simple processes without increasing the size or manufacturing costs of the cryptosystem.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of receiving a bitstream and generating a keystream to be used in a cryptosystem, the method comprising the steps of:
   (a) generating, by a linear feedback shift register (LFSR), the bitstream comprising at least 4 bits;
   (b) receiving the generated bitstream, using a first logic circuit;
   (c) selecting at least two bits from the received bitstream, using a second logic circuit;
   (d) generating an operation value by performing a predetermined bitwise operation on the bits selected in step (c), using a third logic circuit; and
   (e) according to the operation value, either discarding the received bitstream or outputting the rest of the received bitstream not selected in step (c) as the keystream, using a fourth logic circuit.

2. The method of claim 1, wherein
   the predetermined bitwise operation in step (d) is an XOR operation, and
   in step (e), if the operation value is a logic low value, the received bitstream is discarded, and if the operation value is a logic high value, the rest of the received bitstream not selected in step (c) is outputted as said keystream.

3. The method of claim 1, wherein
   the predetermined bitwise operation in step (d) is an OR operation, and
   in step (e), if the operation value is a logic low value, the received bitstream is discarded, and if the operation value is a logic high value, the rest of the received bitstream not selected in step (c) is outputted as said keystream.

4. An apparatus for receiving a bitstream and generating a keystream to be used in a cryptosystem, the apparatus being configured as at least one computer system and comprising:
   a bitstream input unit operable to receive the bitstream, which comprises at least 4 bits, from a bitstream generator;
   a selection unit operable to select at least two bits from the received bitstream;

an operation unit operable to generate an operation value by performing a predetermined operation on the bits selected by the selection unit; and a determination unit operable to, according to the operation value, either discard the received bitstream or output the rest of the received bitstream not selected by the selection unit as the keystream.

5. The apparatus of claim 4, wherein the predetermined operation is an XOR operation, if the operation value is a logic low value, the determination unit discards the received bitstream, and if the operation value is a logic high value, the determination unit outputs the rest of the received bitstream not selected by the selection unit as said keystream.

6. The apparatus of claim 4, wherein the predetermined operation is an OR operation, if the operation value is a logic low value, the determination unit discards the received bitstream, and if the operation value is a logic high value, the determination unit outputs the rest of the received bitstream not selected by the selection unit as said keystream.

7. The apparatus of claim 4, further comprising said bitstream generator which is a linear feedback shift register (LFSR).

8. The apparatus of claim 4, further comprising said bitstream generator which comprises one linear feedback shift register (LFSR).

9. A computer-readable storage medium containing therein computer-executable codes for causing, when executed by at least one computer system, said at least one computer system to receive a bitstream and generate a keystream to be used in a cryptosystem, the codes comprising:

a first code for causing the at least one computer system to receive the bitstream comprising at least 4 bits;

a second code for causing the at least one computer system to select at least two bits from the received bitstream;

a third code for causing the at least one computer system to generate an operation value by performing a predetermined bitwise operation on the bits selected in accordance with the second code; and a fourth code for causing the at least one computer system to compare the operation value with a predetermined value and, depending on said comparison, to output the rest of the received bitstream not selected in accordance with the second code as the keystream.

10. The computer-readable storage medium of claim 9, wherein the predetermined bitwise operation in accordance with the third code is an XOR operation, and in accordance with the fourth code, if the operation value is a logic low value, the received bitstream is discarded, and if the operation value is a logic high value, the rest of the received bitstream not selected in accordance with the second code is outputted as said keystream.

11. The computer-readable storage medium of claim 9, wherein the predetermined bitwise operation in accordance with the third code is an OR operation, and in accordance with the fourth code, if the operation value is a logic low value, the received bitstream is discarded, and if the operation value is a logic high value, the rest of the received bitstream not selected in accordance with the second code is outputted as said keystream.

12. The computer-readable storage medium of claim 9, said codes further comprising a fifth code for causing a linear feedback shift register (LFSR) of the at least one computer system to generate the bitstream.

* * * * *